Feb. 5, 1957 A. G. ANDERSON 2,780,798

SPIN ECHO MEMORY SYSTEMS

Filed Aug. 12, 1954 4 Sheets-Sheet 1

INVENTOR.
ARTHUR G. ANDERSON
BY
Van Deventer & Shively
ATTORNEYS

Feb. 5, 1957 A. G. ANDERSON 2,780,798

SPIN ECHO MEMORY SYSTEMS

Filed Aug. 12, 1954 4 Sheets-Sheet 2

INVENTOR.
ARTHUR G. ANDERSON
BY
Van Deventer & Shively
ATTORNEYS

Feb. 5, 1957 A. G. ANDERSON 2,780,798

SPIN ECHO MEMORY SYSTEMS

Filed Aug. 12, 1954 4 Sheets-Sheet 3

INVENTOR.
ARTHUR G. ANDERSON
BY
Van Deventer & Shively
ATTORNEYS

SPIN ECHO MEMORY SYSTEMS

Filed Aug. 12, 1954

4 Sheets-Sheet 4

INVENTOR.
ARTHUR G. ANDERSON
BY
Van Deventer & Shively
ATTORNEYS

United States Patent Office 2,780,798

Patented Feb. 5, 1957

2,780,798

SPIN ECHO MEMORY SYSTEMS

Arthur G. Anderson, Riverdale, N. Y., assignor to International Business Machines Corporation, a corporation of New York Application August 12, 1954, Serial No. 449,309

11 Claims. (Cl. 340—173)

The present invention pertains to improvements in spin echo memory systems, being a continuation in part of co-pending application Serial No. 443,216, filed July 14, 1954, now Patent No. 2,714,714.

The above-mentioned co-pending application has set forth a system in which, for example, information is stored by radio-frequency magnetic pulses applied to gyromagnetic nuclei of a chemical substance in a polarizing magnetic field and is subsequently recovered as spin echoes by nuclear induction, discriminator pulses or changes in the magnetic field condition being applied at appropriate times to destroy unwanted or spurious echoes.

An object of the present invention is to provide a spin echo method in which changes in the polarizing field are utilized for the storing and comparison of information, applicable for example to moving target indication, or generally as a sensitive method of detecting changes in the time duration or related characteristics of a repeated phenomenon, whether periodic or non-periodic.

A further object is to provide a spin echo method in which a series of entered R. F. pulses and their normally resulting echoes are utilized as a carrier train on which information is impressed by means of field pulses or changes controllable by the phenomena to be compared or measured.

A further object is to provide a method of the above type in which field pulses representative of one or more of the factors to be studied may be applied during entry of the R. F. carrier pulses, and in which other field pulses representative of the other factor or factors to be compared or measured are applied during the echo series, the observed resultant behavior of the echo series providing the desired informational indications.

A further object is to provide a system of the above type having a relatively long memory period, whereby factors such as changes in speeds of moving objects, magnitudes and durations of currents representative of various physical entities, etc., may be analyzed with a high degree of precision.

Other objects and advantages of the invention will become evident during the course of the following description in connection with the accompanying drawings, in which Figures 1 and 2 are joint diagrams illustrating suitable spin echo apparatus for carrying out the invention;

Figure 5:
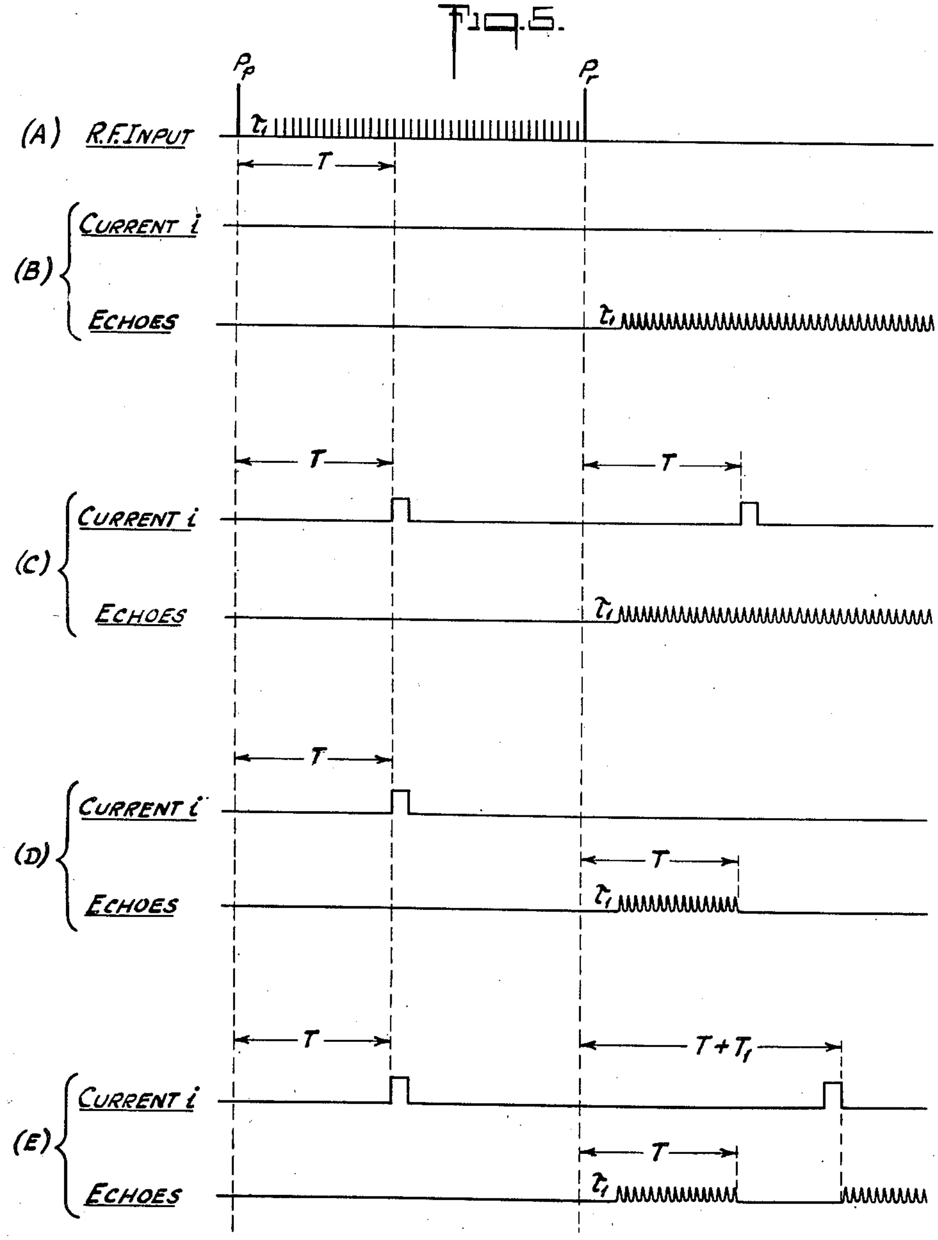
Figure 6:
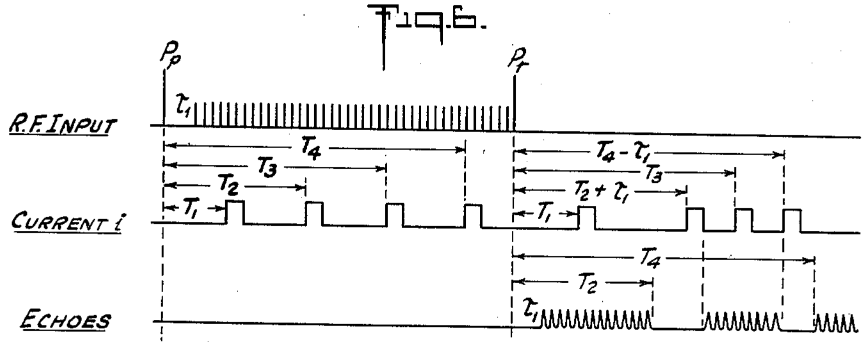
Figure 7:
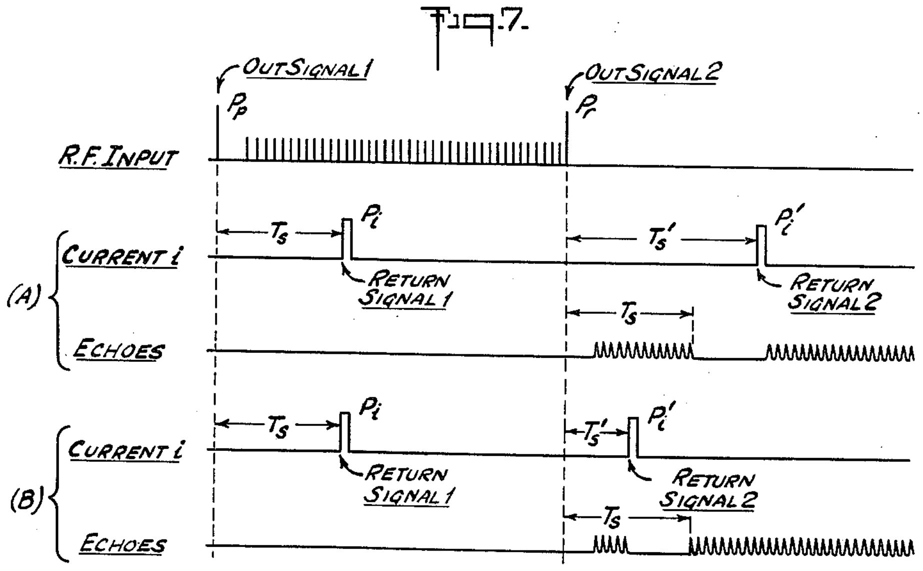
Figure 8:
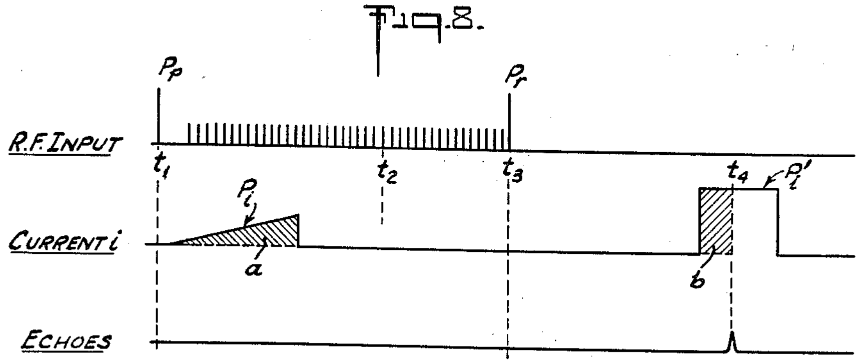

Figure 5, containing related sub-figures A, B, C, D and E, illustrates by time diagrams the behavior of the echo train with various field pulse applications;

Figure 6 similarly illustrates echo indications with multiple informational field pulsing;

Figure 7 is a diagram showing a typical application of the method to analysis of signals reflected from a moving object, and Figure 8 illustrates the condition of integral or area symmetry between dissimilar field pulses.

Spin echo technique, based generally on the behavior of spinning gyroscopic particles in polarizing fields, may best be illustrated as applied to atomic nuclei affected by a strong magnetic field and producing the desired echo effects due to free nuclear induction. The phenomenon of free nuclear induction per se has been set forth in U. S. Patent No. 2,561,489, to F. Bloch et al., as well as in various well-known scientific publications by Bloch and by Purcell. The extension of the effect to produce spin-echoes, the work of E. L. Hahn, was described by the latter scientist in an article entitled "Spin Echoes," published in Physical Review, Nov. 15, 1950. As the above publications are readily available in the public domain, repetition herein of the entire complex mathematical analysis contained in them is obviously unnecessary. However, in order to set forth most clearly the nature and advantages of the present invention, it is appropriate first to describe briefly the pertinent general principles of spin-echo technique.

Nuclear induction, while in itself a magnetic effect, is based on a combination of magnetic and mechanical properties existing in the atomic nuclei of chemical substances, good examples being the protons or hydrogen nuclei in water and various hydrocarbons. The pertinent mechanical property possessed by such a nucleus is that of spin about its own axis of symmetry, and as the nucleus has mass, it possesses angular momentum of spin and accordingly comprises a gyroscope, infinitely small, but nevertheless having the normal mechanical properties of this type of device. In addition, the nucleus possesses a magnetic moment directed along its gyroscopic axis. Thus each nucleus may be visualized as a minute bar magnet spinning on its longitudinal axis. For a given chemical substance, a fixed ratio exists between the magnetic moment of each nucleus and its angular momentum of spin. This ratio is known as the gyromagnetic ratio, and is normally designated by the Greek letter $\gamma$.

A small sample of chemical substance, such as water as previously noted, obviously contains a vast number of such gyroscopic nuclei. If the sample is placed in a strong unidirectional magnetic field these spinning nuclei align themselves with their magnetic axes parallel to the field, after the manner of a large gyroscope standing erect in the earth's gravitational field. In the aggregate, whether the various nuclear magnetic moments are aligned with or against the field is determined largely by chance, but while a large number aligned in opposite directions cancel each other, there always exists a net preponderance in one direction which for analysis may be assumed as with the field. Thus the sample, affected by the magnetic field, acquires a net magnetic moment $M_0$ and a net angular momentum $I_0$, which two quantities may be represented as the vector sums of the magnetic moments and spins of all the nuclei concerned.

So long as the sample remains undisturbed in the field, the gyroscopic nuclei remain in parallel alignment therewith as noted. If however, a force is applied which tips the spinning nuclei out of alignment with the main field, upon release of the displacing force the spinning nuclei, urged again toward realignment by the force of the field, rotate or precess about the field direction in the familiar gyroscopic manner. Precession occurs with a radian frequency $\omega_0=\gamma H_0$, where $H_0$ is the field strength affecting each nucleus and $\gamma$ is the previously noted gyromagnetic ratio. This precessional frequency $\omega_0$ is termed the Larmor frequency, and since for any given type of nuclei $\gamma$ is a constant (for example $2.68\times10^4$ for protons or hydrogen nuclei in water), it is evident that the Larmor frequency of each precessing nucleus is a direct function of the field strength affecting that particular nucleus. It will further be evident that if the field strength $H_0$ is of differing values in different parts of the sample, the groups of nuclei of these various parts will exhibit net magnetic moments processing at differing Larmor frequencies.

Figure 1:
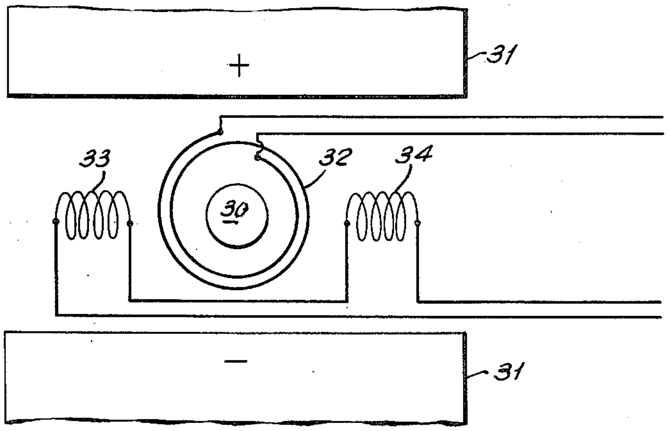

It is upon the above described characteristic of differential precession in an inhomogeneous field that the technique of spin-echoes is based. For clarity in the following general explanation, it is first appropriate to describe briefly an example of suitable apparatus for producing the effects, such apparatus being shown diagrammatically in Figures 1 and 2. Referring first to Figure 1, the numeral 30 designates a sample of chemical substance, for example water or glycerine, in which information is to be stored. The sample 30 is disposed between the pole faces of a magnet 31, preferably of the permanent horn type, but which of course if desired may be instead the electromagnetic equivalent. The main magnetic field H exists in the vertical direction, while a radio-frequency coil 32 is arranged to supply a field with its axis into or out of the paper of the diagram, the R. F. field thus being perpendicular to the $H_0$ field. A pair of direct current coils 33 and 34, arranged as shown diagrammatically with respect to the magnet 31 and R. F. coil 32, are provided to introduce additional field inhomogeneities as hereinafter set forth.

Figure 2:
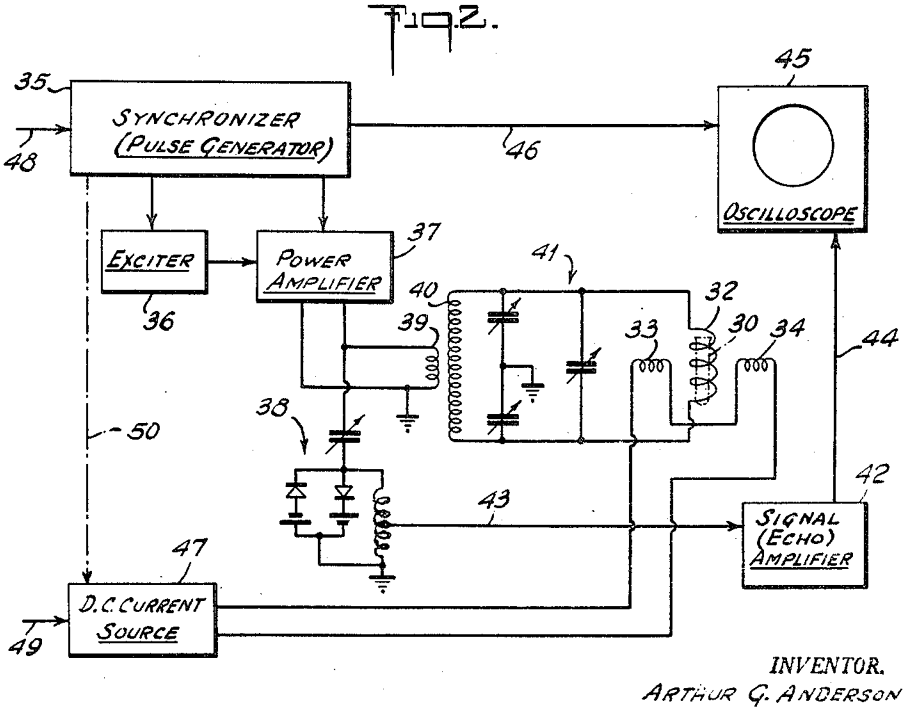

Figure 2 illustrates by semi-block diagram a typical electrical arrangement by which the impulses may be stored and echoes recovered from the sample 30. Inasmuch as the internal structures and modes of operation of the labelled block components are in general well known in the electronic art description thereof will appropriately be limited to that necessary to explain the manner in which or with what modification they play their parts in carrying out the present invention.

A synchronizer or pulse generator 35 originates prepulses recollection pulses and entry or storage pulses required by the system. An exciter unit 36 controllable by the pulse source 35 and comprising an oscillator and a plurality of frequency doubling stages serves as a driving unit for the R. F. power amplifier 37. In the production of a pulse the source 35 first energizes the exciter 36 to place an R. F. driving signal on the amplifier 37 then "keys" the amplifier to produce an output signal therefrom. This output is routed via a tuning network 38 to a coil 39 which is inductively coupled to a second coil 40 adapted to supply energy to a circuit network 41 the latter including the previously described R. F. coil 32, Fig. 1, containing the sample 30. A signal amplifier 42 has its input conductor 43 connected into the tuning network 38 so that any echo signal induced in the R. F. coil 32 and transmitted back via the coils 40 and 39 is impressed on this amplifier. The output 44 of the amplifier 42 is directed to suitable apparatus for utilization of the echo pulses such apparatus being illustrated herein by an oscilloscope 45 provided with a horizontal sweep control connection 46 with the synchronizer 35. A D. C. current source 47 is adapted to supply current to the coils 33 and 34 for purposes to be hereinafter explained at length.

In initiating spin-echo effects, the sample 30 is first subjected to the polarizing magnetic field $H_0$ for sufficient time to allow its gyromagnetic nuclei to become aligned as previously described. Taking the simplest case of a single echo production, the sample is then subjected to a pulse of an alternating magnetic field $H_1$ produced by R. F. alternating currents in the coil 32 and hence normal to the direction of the main field $H_0$. This R. F. magnetic field pulse exerts a torque on the spinning nuclei which tips them out of alignment with $H_0$, so that as the pulse terminates the nuclei begin to precess about the main field direction, conveniently termed the Z-axis, with their characteristic Larmor frequencies. Their magnetic moments or components thereof thus rotate in a plane normal to the Z-axis, which plane accordingly may be termed the XY plane. Taking for example the behavior of a related group of spinning nuclei as characteristic of all such particles in the sample, it will be evident that the inhomogeneity of the field $H_0$ in different parts of the sample gives rise to the previously explained differential Larmor precession, so that while the group as a whole continues to rotate at a means rate $\bar{\omega}_0$, the constituent moments of the group fan out or separate from each other at rates dependent on their particular differences in Larmor frequency. So long as this spreading condition persists, the diffusion of the constituent moments of the group prevents their cooperation to generate a signal.

To initiate echo formation, the sample is subjected to a powerful R. F. pulse, termed the "recollection" pulse, which in effect changes the divergence of the constituent moments to convergence. With maintenance of proper time and field condition relationship, as further noted hereinafter, the rotating moments eventually return to coincidence, at which point they reinforce each other to induce a signal in the R. F. coil 32, this signal being the "echo" of the "entry" R. F. pulse which initiated the sequence. The signal is transmitted to the amplifier 42, amplified, and directed to the oscilloscope 45 or other device for utilization.

The above description, as noted, set forth for illustration the simple case of a single echo, in which case the maximum echo signal would normally be produced by applying an "entry" pulse sufficient to tip the moment group through 90°, i. e., completely into the XY plane. Lesser angles of tip also produce useful moment groupings, so that by applying successive entry pulses of proper duration and amplitude, a plurality of entries may similarly be made to produce a corresponding train of echoes. However, in this and all other variations of the process as hereinafter set forth, it will be understood that the basis of echo production is the same, namely the systematic disassembly and subsequent systematic reassembly of related moments of spinning particles in a suitable field.

Figure 3:
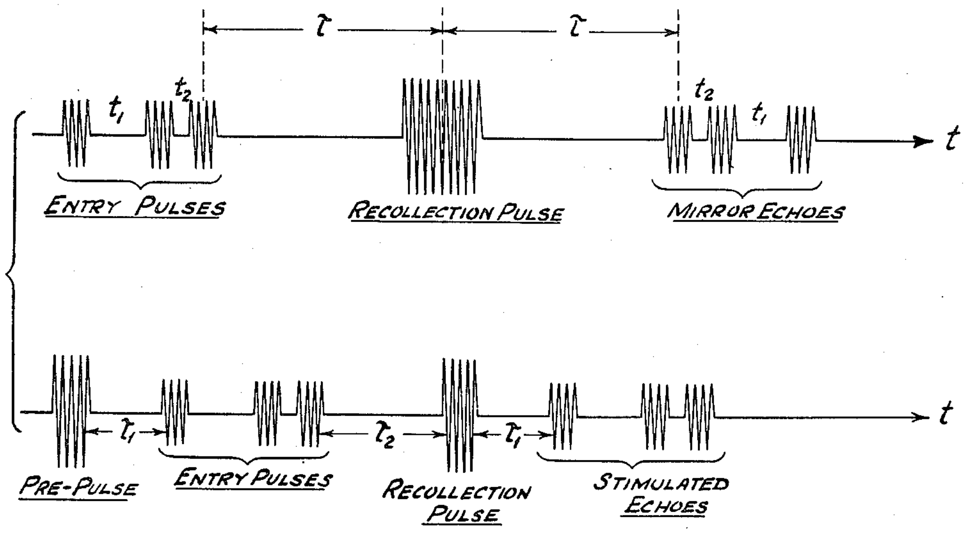
Figure 3 is a time diagram illustrating two types of spin echo sequences.

In practice, there are two important types of procedure in spin-echo formation, namely the "mirror echo" process and the "stimulated echo" process, illustrated in comparison in Figure 3. In this figure the ordinate represents the voltage across the terminals of the R. F. coil 32 containing the sample, while the abscissa represents time. In order to make illustration feasible, the echo pulses have been drawn $10^5$ times larger than they would be on a scale of the ordinate suitable for drawing the storage and recollection pulses. The duration of each storage pulse may be of the order of a few microseconds, whereas the times $\tau$, which are the "memory" or "storage" intervals, may be for example of the order of seconds when water is used as a storage medium comprising the sample 30.

The difference in storage methods for "mirror" and "stimulated" echo production, which is a fundamental distinction, has been set forth in detail in the previously mentioned scientific publication and co-pending applications, and therefore need be reviewed only in pertinent relation to the present invention. In mirror storage, as illustrated, the entry pulses, applied to the nuclei as previously explained, precede the recollection pulse in their chosen order, while the echoes follow the recollection pulse in reverse order. Thus it will be seen that the echo and storage pulses have "mirror" symmetry with respect to the center of the recollection pulse, hence the characteristic name for this type of echo procedure.

In the case of the stimulated echo process, as shown in the diagram, an R. F. "pre-pulse" $P_p$ is first applied to the sample. This pre-pulse is of sufficient amplitude and duration to tip all the nuclear moments of the sample substantially through 90 degrees, i. e., into the XY plane, where during a time interval $\tau_1$ they are permitted to spread and distribute themselves throughout the plane by differential Larmor precession as previously explained. Following the time interval $\tau_1$ the storage pulses are applied, these pulses having the effect of depositing groups or "families" of moment vectors on a system of cones revolving about the Z-axis or direction of the field H, i. e., the pulses may be described as entered into "Z-axis storage."

The recollection pulse $P_r$ is of proper duration and amplitude to tip the revolving moment cones again into the XY plane, at the same time having the effect of reversing the relative angular motions among the constituents of each moment group. Thereupon the constituents of the respective groups re-assemble to induce echo pulses in the coil 32, these pulses starting at the end of a second time period $\tau_1$ after the recollection pulse and appearing in the same order as their corresponding entry pulses. Thus the figure for the stimulated echo process will be seen to have "translational" symmetry in the relation of the entry pulses to the pre-pulse and the echoes to the recollection pulse.

If the condition of the magnetic field $H_0$ were to remain constant throughout, it will be evident that the above described "mirror" and "translational" symmetries necessary for echo production would be symmetries purely in time. However, if the inhomogeneity of $H_0$ varies, the variation introduces a second factor of field condition which must be considered together with the time factor and in integrated relation thereto. In the present invention, variations in field inhomogeneity are produced by supplying direct current pulses to the coils 33 and 34. Within the limits of operation the effective field change produced is proportional to the current $i$ in the coils, so that this current $i$ may hereinafter conveniently be used as representative of the field change itself.

Figure 4:
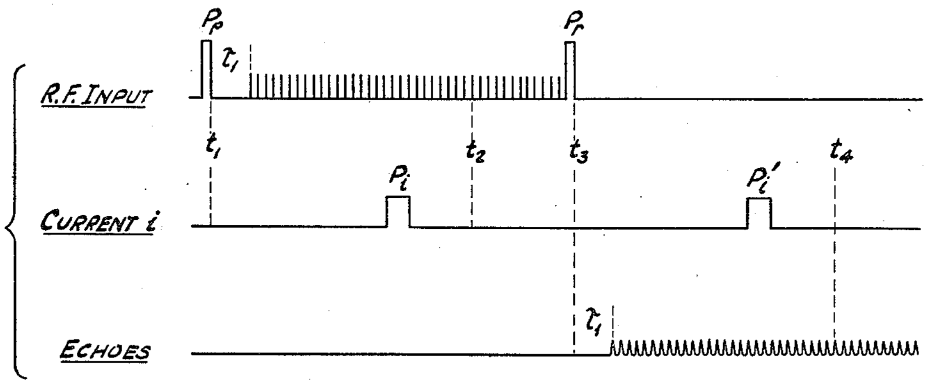
Figure 4 illustrates the necessity for integral time and field condition symmetry in echo production.

Figure 4 illustrates a stimulated echo process as applied in the present invention. The fundamental requirement for stimulated echo production, that is translational "integral" symmetry in time and field condition, may be examined in connection with this figure by considering that point $t_1$ represents the termination of the pre-pulse $P_p$ and $t_2$ is the instant at which a particular storage pulse is entered, it being desired to produce a corresponding echo at time $t_4$ following the termination $t_3$ of the recollection pulse. Considering also that the current $i$ (and hence the field inhomogeneity) is to be varied during the process, the necessary translational symmetry condition for echo production is $$\int_{t_1}^{t_2} i\,dt=\int_{t_3}^{t_4} i\,dt$$

In Figure 4 the changes in $i$ are represented as two equal pulses $P_1$ and $P'_1$ at corresponding time points following the pre-pulse and recollection pulses respectively. So far as the particular echo at $t_4$ is concerned this need not be the case, i. e., $P_1$ and $P'_1$ can be irregularly spaced and/or shaped, so long as the above noted integral symmetry condition is maintained. However, in this latter case, while the echo at $t_4$ would be preserved, other echoes in the train would not have the necessary symmetry and would be destroyed. In other words, the system is essentially a differential device, comparing $$\int_{t_1}^{t_2} i\,dt \text{ to } \int_{t_3}^{t_4} i\,dt$$

for every point in the train, and producing an echo signal if and only if, the two integrals are equal.

Fig. 5 further illustrates the above point, in order to aid in showing how the present invention utilizes current variation rather than the R. F. pulses themselves for the storing of information. As shown in Fig. 5A, the R. F. input consists of the pre-pulse $P_p$, a continuous series of entry or storage pulses, and the recollection pulse $P_r$. If, as in Fig. 5B, the current pulse is lacking, the change in the magnetic field is zero throughout the pre-pulse to recollection pulse period and throughout the read-out period, so that the echoes appear in their normal form as expected.

Referring to Fig. 5C, if a current pulse is applied at time T after the pre-pulse and a second equal current pulse at time T after the recollection pulse, the entry comes back in the form of echoes unaltered, the provision of translational symmetry being that explained in connection with Fig. 4.

With reference to Fig. 5D, if a current pulse is applied at time T after the pre-pulse, but none is applied after the recollection pulse, the echoes occur as shown during the time from the recollection pulse to the expiration of period T, after which they are destroyed. This is because the echoes throughout time T have the requisite translational integral time and field conditional symmetry with the originating storage pulses, but lack of a second field pulse denies such symmetry thereafter. In all cases it should be borne in mind that entered R. F. carrier pulses are immune to field changes while they are in Z-axis storage, i. e., destruction occurs only in the echo period when the moment groups have been returned to XY-plane storage by the recollection pulse.

Fig. 5E illustrates conditions when the current pattern consists of a current pulse at time T after the pre-pulse and a second pulse ending at time T plus $T_1$ after the recollection pulse. The echo output consists of echoes through time T after the recollection pulse, whereupon they cease until the additional time $T_1$ has elapsed; at this time the second field pulse has restored the requisite translational integral symmetry, and the echoes accordingly reappear and continue until the end of the train.

By comparing Figure 5C and 5E it is apparent that where the equal current pulses came at the same time with respect to the pre-pulse and recollection pulse, no modification of the echo output train was produced, whereas a movement of the second pulse to a relatively later position than the first pulse produced a hole or null reading in the echo train. It will thus be evident that the method provides a system which will indicate the movement of one current pulse with respect to another, and furthermore, if a uniform shape of current pulse is used, the length of the blank indication is an accurate gage of the magnitude of the relative movement.

Pursuant to the above description, it further becomes evident that if a plurality of current pulses are applied to the system both before and after the recollection pulse, change in the echo output will occur only in the cases where some motion or absence of a current pulse has occurred. Figure 6 illustrates a situation in which the current input consists of four pulses 1, 2, 3 and 4. Current pulses 1 and 3 are represented as stationary with respect to time after the pre-pulse as compared with time after the recollection pulse, whereas pulse 2 moves outward and pulse 4 moves inward. This produces a train of echoes arriving in groups as shown in the lower line of the diagram. At the time $T_2$ after the recollection pulse when current pulse 2 normally should appear but does not, the echoes cease; but at the time when current pulse 2 actually has finished, the echoes appear again. At the time when current pulse 4 actually occurs after the recollection pulse (which is sooner than it normally should have occurred), the echoes are destroyed until the time at which current pulse 4 should have occurred, when the echoes again appear. Thus it has been shown how the motion of two current pulses will produce two holes or blanks in the echo train. Obviously similar results and combinations may be produced with various numbers and arrangements of pulses.

An example of the use of the invention may be shown in its application to moving target indication. Fig. 7 illustrates such an operation in connection with underwater detection by the sending out of successive sound signals and the reception of the resulting return signals reflected from a target.

In this case the pulse generator 35, Fig. 2, may be triggered to initiate the R. F. pre-pulse $P_p$ and recollection pulse $P_r$ by signals received via a control connection 48 from the sound-signalling device, these pulses being coincident respectively with successive output sound signals. The D. C. current source 47 similarly is triggered via a connection 49 from the receiver of the sound apparatus, so that successive reflected or "in" signals give rise to successive current pulses $P_i$ and $P'_i$ following the pre-pulse and recollection pulse respectively. The pulse generator 35 provides, following the pre-pulse, the continuous series of closely spaced storage or carrier pulses $P_s$.

In operation, it will be seen that the R. F. pulses $P_p$ and $P_r$ comprise starting indices for testing the lapse of times between each of the successive "out" sound signals and its respective reflected return or "in" signal. If these elapsed times are equal, i. e., if the target is stationary, obviously the system has the required translational integral symmetry, and the pulse train appears in uninterrupted entirety as previously shown in Fig. 4. However, if the above elapsed times are not equal, i. e., if the target is approaching or receding, the translational symmetry is destroyed and a gap appears in the echo train. Thus if the target is receding, as illustrated in bracket A, Fig. 7, the reflection time $T'_s$ for the second signal is greater than the corresponding time $T_s$ for the first, so that a gap of substantially $T'_s - T_s$ is introduced in the echo train.

Similarly, as in bracket B, if the target is approaching, reflection time $T'_s$ is less than $T_s$, and a gap of substantially $T_s - T'_s$ appears. With repeated comparison of successive pairs of detector signals, inward movement of the gap in the echo train obviously indicates approach of the target while outward movement indicates recession, while in each case the length of the gap in the echo train, taken in connection with the constants of the system, provides an indication of the speed of approach or recession. In order to provide ample "recovery" time for the spinning nuclei after the completion of the echo train, the synchronizer 35 is arranged to gate out a number of signals from the sound device following each test of an adjacent pair. Incidentally, in the case of a stationary target, gating out either field pulse will produce a stop in the echo train at a time period after the recollection pulse indicative of the distance or range of the target.

It will be understood that the necessities of illustration herein have required the various pulses of the system to be shown with exaggerated duration. In practice these pulses may be of very short duration, the echoes for example being spaced so closely together as to normally appear substantially as a continuous band in which gaps produced by field pulses appear with sharp definition. From the examples given it will be evident that due to the relatively long "memory" period available in a spin echo system by proper choice of the sample 30, the comparative indications provided by the present method may be spread over a wide field of observation so as to produce a correspondingly high degree of precision and sensitivity.

For purposes of simplicity in explanation, the foregoing illustrations have embodied field pulses of similar rectangular shape and size. However, from the general integral requirements $$\int_{t_1}^{t_2} i\,dt - \int_{t_3}^{t_4} i\,dt$$

it can be seen that for various applications the method is by no means limited to the use of such uniform pulses. This fact is illustrated in Fig. 8, in which a current pulse $P_i$ of any contour, shown as triangular for example, is applied shortly following the pre-pulse $P_p$, and a relatively large rectangular current pulse is impressed late in the period following the recollection pulse $P_r$. In the earlier portion of the latter period no integral symmetry can exist, for lack of any field pulse to counteract or match the effect of the prior pulse $P_i$, so that initially no echoes form. However, after the onslaught of the pulse $P'_i$ the latter starts to supply the deficiency, until the shaded area *b* of pulse $P'_i$ first becomes equal to the area *a* of pulse $P_i$ at a time point $t_4$, after which the area of $P'_i$ starts to exceed the area *a*. Thus at the point $t_4$ the system passes through a momentary condition of translational integral symmetry, causing a sharp node or momentary echo indication to form as shown. This illustration demonstrates the fact that the method provides for comparison of various other factors as well as time, for instance charge as represented by the two current-time areas. If the amplitude and duration of a pulse such as $P_i$ are controlled as representative of other factors, and if the amplitude and beginning time of the pulse $P'_i$ are directly controlled, for example by the synchronizer 34 via a suitable connection 50 to the D. C. source 47, Fig. 2, the charge area *b* in Fig. 4 may readily be derived and converted to the desired terms of the other factors mentioned.

From the above and the previous examples given, it will be obvious to those skilled in the art that the present method presents a large number of operational combinations applicable to a wide variety of test, comparative, measuring, and related uses. A major point of difference between it and prior spin echo procedures lies in the fact that in prior practice the information storage and extraction are normally carried out in terms directly of the entered R. F. "information" pulses and their resultant echoes, whereas in the present invention the entered R. F. pulses and their echoes are used primarily as a carrier train on which information is impressed by "information" pulses of field variation, resulting in the highly varied and advantageous range of applicability mentioned. This primary use of the input and echo train as a carrier, however, does not preclude it from also performing certain informational functions if desired, as for example the use of an R. F. storage pulse of extra amplitude at regular intervals in the storage train, in order to provide a corresponding time scale or index in the echo train. Also, the description has been directed largely to the use of the method with stimulated echoes, but it will be evident that the same general method may be applied if desired for any purpose to a mirror type of operation, the only difference in requirement being that the integral symmetry in time and field condition be of the mirror rather than the translational type. Similarly, for some purposes the R. F. storage conditioning input, instead of comprising a large number of short pulses as illustrated, may consist of any other desired number and duration of input applications, including and ranging upward from a single application which may be of long duration, with normally corresponding echo effects. In other words, while the invention has been set forth in preferred form, it is not limited to the exact combinations and procedures illustrated, as various modifications may be made without departing from the scope of the appended claims.

I claim:

1. That method of information storage and recovery by differential precession of related moments of spinning particles in an inhomogeneous polarizing field, which includes the steps of establishing a carrier train containing a succession of storage conditioning pulses applied to said spinning particles in a first time period and normally adapted to contain a succession of resultant spin echo pulses formed by said moments in a second time period, formation of each of said echo pulses from its originating pulse being substantially dependent on integral symmetry in time and field condition relative to said originating pulse and said resultant echo pulse in said first and said second time periods respectively, entering informational variation of inhomogeneity in said field to selectively affect said integral symmetry respecting said related pairs of storage pulses and resultant echo pulses, whereby the resultant condition of said echo series may be indicative of said entered informational variation, and detecting said echo series.

2. A method according to claim 1 wherein said informational entering step comprises applying a pulse of field inhomogeneity solely during said storage period, whereby said integral symmetry may be disturbed to interrupt said echo series at a time in said second time period indicative of the time of application of said information pulse in said first time period.

3. A method according to claim 1 wherein said informational entering step comprises applying pulses of field inhomogeneity change representative of two physical phenomena to be compared in said first and second time periods respectively, whereby characteristic difference between said representative pulses in said periods may disturb said integral time and field condition symmetry to interrupt said echo series in indication of corresponding difference between said phenomena.

4. In spin echo technique including systematic disassembly and reassembly of related moments of gyromagnetic nuclei precessing differentially in an inhomogeneous magnetic field, that method of entering and extracting information which includes the steps of establishing a carrier train including a series of radio-frequency magnetic storage pulses applied to said nuclei in a first time period and normally adapted to include a series of resultant echo pulses formed by said related moments in a second time period, said resultant echo pulse formation being substantially dependent on translational integral symmetry in time and magnetic field condition between each of said resultant echo pulses in said second time period and its causative storage pulse in said first time period, magnetically impressing variation in inhomogeneity representative of informational data on said field to correspondingly affect said translational integral symmetry condition, whereby the resultant condition of said echo series may be indicative of said informational data, and detecting said echo series.

5. A method according to claim 4 wherein said carrier train includes a radio-frequency pre-pulse initiating said first time period and a radio-frequency recollection pulse initiating said second time period, the terminations of said pre-pulse and said recollection pulse comprising the incidence of said normal translational integral symmetry respecting said two periods.

6. A method according to claim 4 wherein said carrier train includes a radio-frequency pre-pulse initiating said first time period and a radio-frequency recollection pulse initiating said second time period, including the further steps of impressing said pre-pulse in response to the first of a pair of time-spaced control pulses, impressing said recollection pulse in response to the first of a second pair of time-spaced control pulses, and wherein said field varying step includes pulsing said field during said first time period in response to the second of said first pair of control pulses and similarly pulsing said field in said second time period in response to the second of said second pair of control pulses, whereby difference in internal time spacings of said two pairs may disturb said translational integral symmetry to establish a gap in said echo series in indication of said difference.

7. A method according to claim 4 wherein said impressed field variation comprises pulses of differing amplitude and duration characteristics applied during said first and second time periods.

8. A method according to claim 4 wherein said impressed field variation comprises a pulse of non-constant amplitude applied in said first time period and a second pulse of constant amplitude applied at a relatively later arbitrary point in said second time period, momentary achievement of said translational integral symmetry condition during said second pulse being adapted to establish a nodal echo indication.

9. A method according to claim 4 wherein said impressed field variation comprises a plurality of pulses applied in a first timing relation in said first time period and a second plurality of similar pulses applied in differing timing relation in said second time period, whereby gaps indicative of said difference in timing relations may be established in said echo series.

10. In a spin-echo memory process in an inhomogeneous polarizing field, said process including a series of storage pulses and being normally adapted to include a series of echo pulses resultant from said storage pulses, that method of entering and extracting information which includes the steps of impressing informational changes in inhomogeneity on said field during said process and detecting the effect of said changes on said echo series.

11. In a spin-echo memory process in an inhomogeneous polarizing field and including a radio frequency conditioning storage application and normally including a resultant echo production, that method of entering and extracting information which includes the steps of impressing informational variation on said field during said process and detecting the effect of said variation on said echo production.

References Cited in the file of this patent

UNITED STATES PATENTS 2,700,147 Tucker ---------------- Jan. 18, 1955